Feb. 19, 1946.    D. I. WILSON ET AL    2,395,365
TURNING MACHINE
Filed Aug. 17, 1942    4 Sheets-Sheet 1
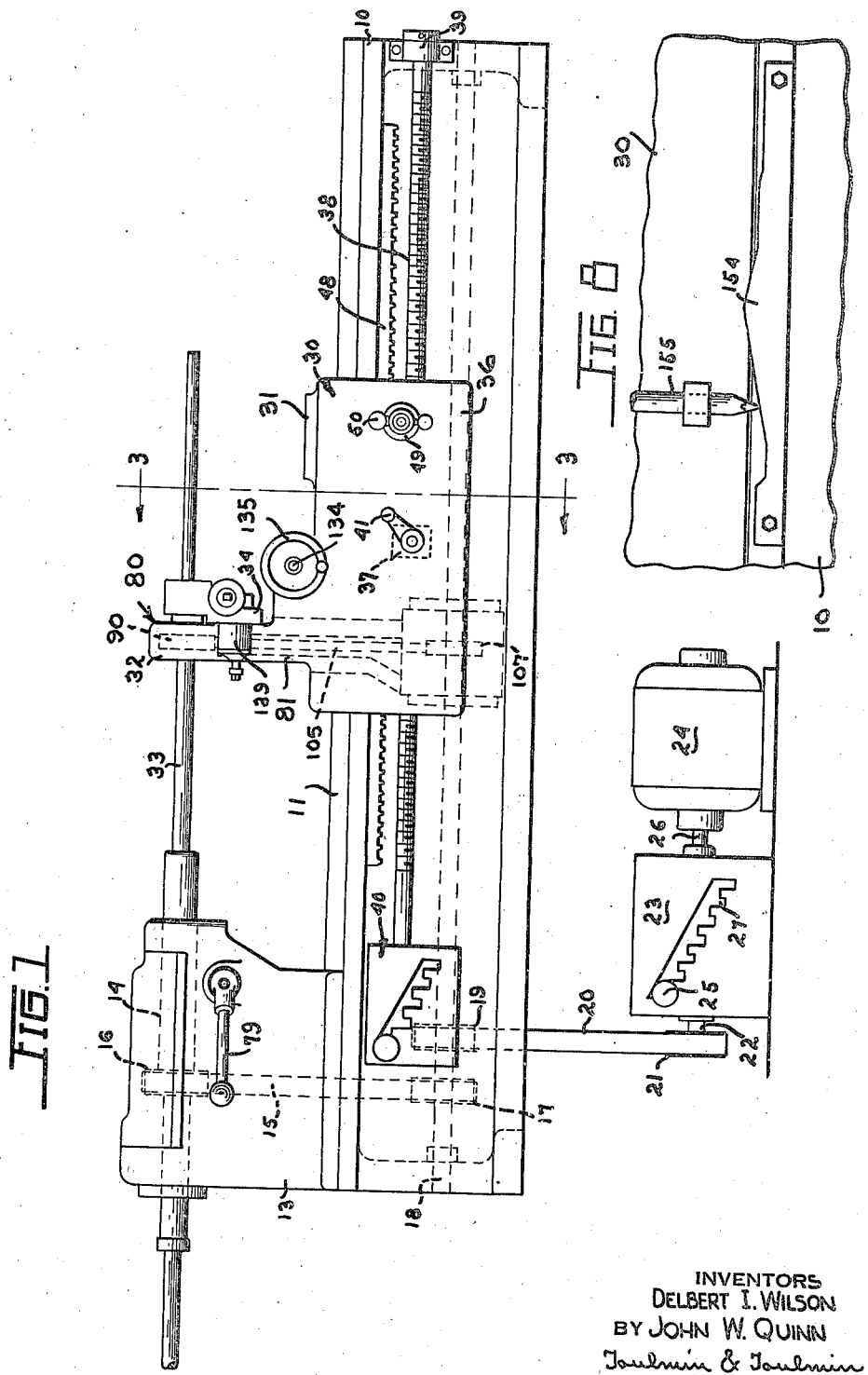
INVENTORS
DELBERT I. WILSON
BY JOHN W. QUINN
Toulmin & Toulmin
ATTORNEYS

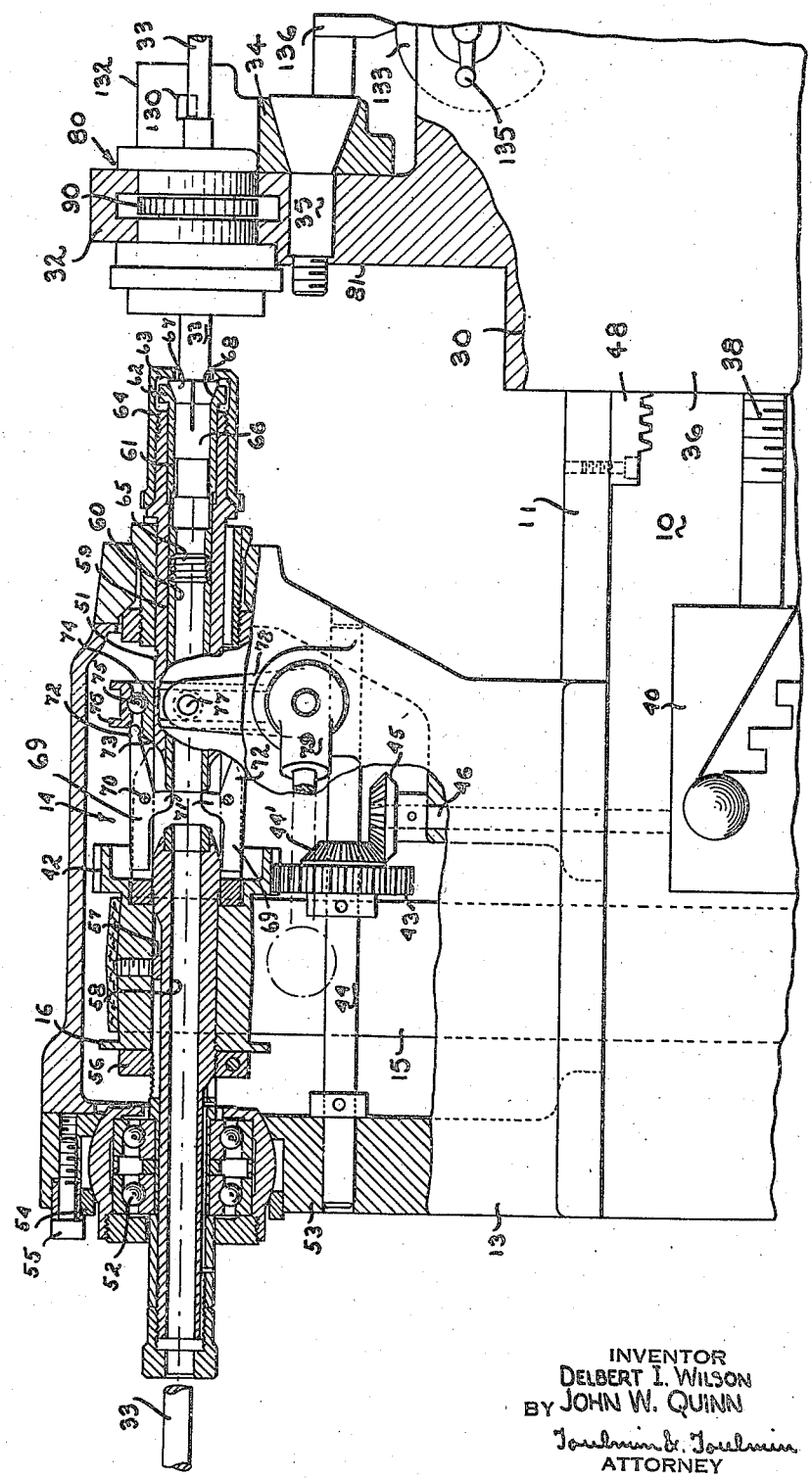

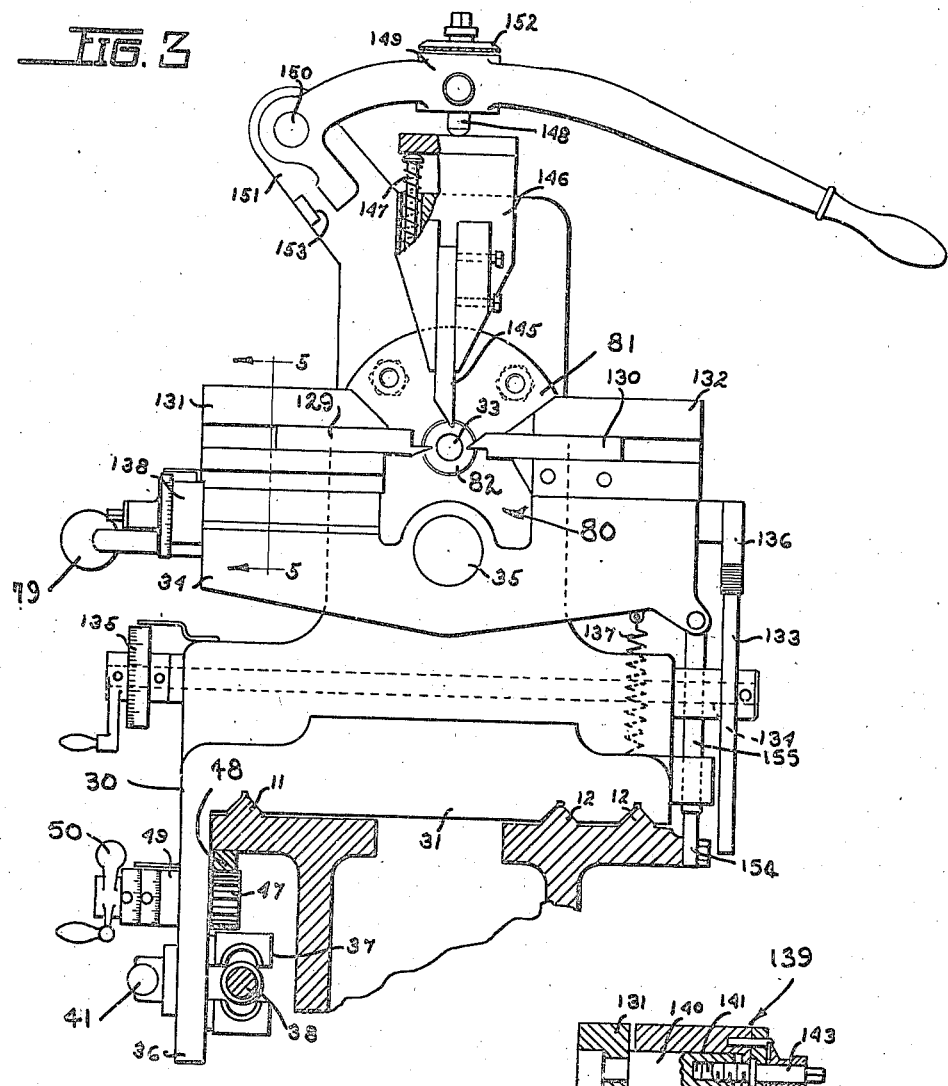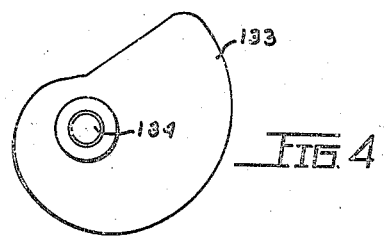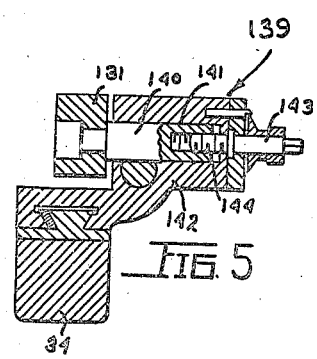

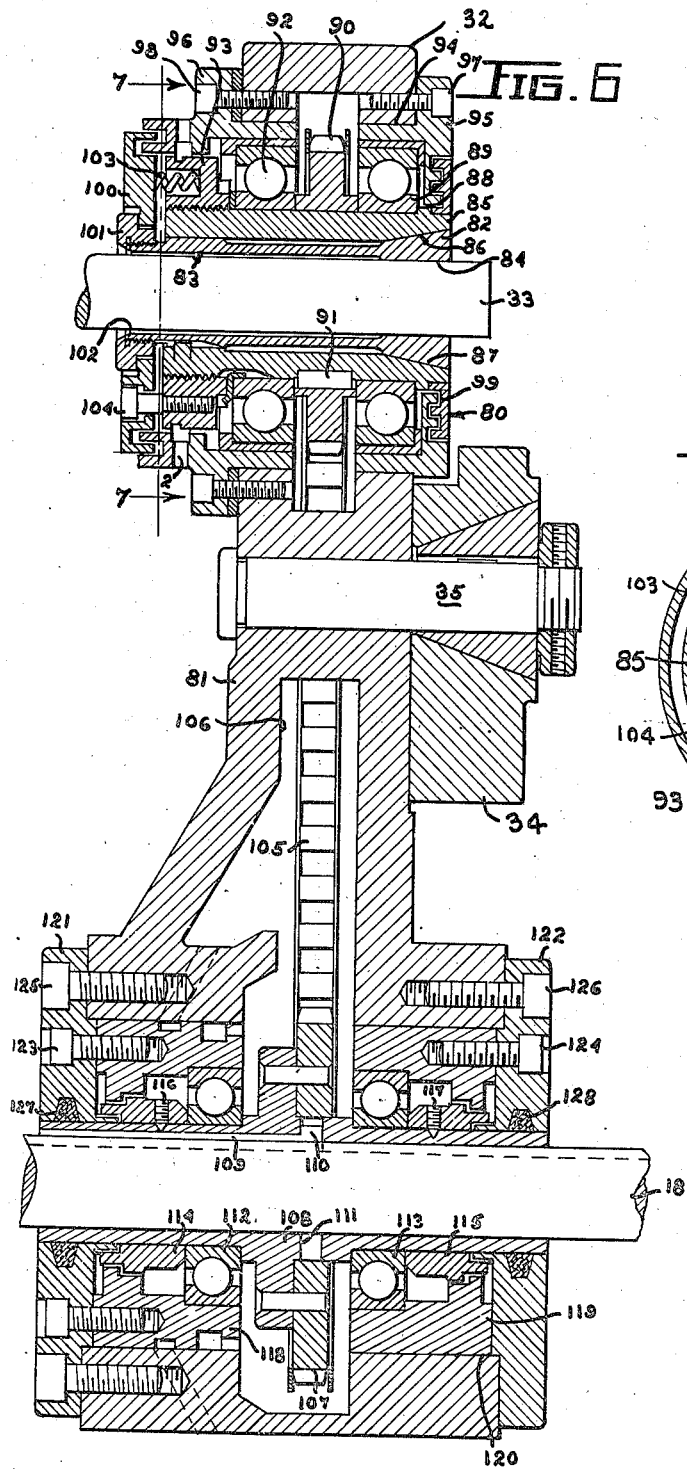
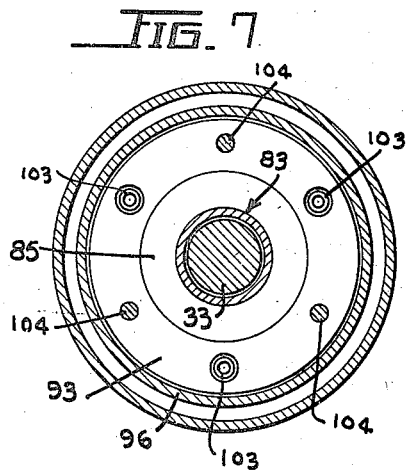

Patented Feb. 19, 1946

2,395,365

UNITED STATES PATENT OFFICE 2,395,365

TURNING MACHINE

Delbert I. Wilson and John W. Quinn, Dayton, Ohio, assignors to The City Engineering Company, Dayton, Ohio, a corporation of Ohio Application August 17, 1942, Serial No. 455,084

12 Claims. (Cl. 82—2)

This invention relates to turning machines that are particularly adapted to work upon bar stock.

An object of the invention is to provide a turning machine wherein the bar stock of any length can be worked upon by turning tools that are disposed adjacent a support member for the bar stock that is maintained in a predetermined relationship to the turning tools so that the bar stock is always supported adjacent the turning tools regardless of the position of the supporting member and the turning tools along the length of the member that is being produced from the bar stock.

Another object of the invention is to provide a turning machine wherein there is provided a spindle that is adapted to drivingly engage the work stock that extends through the spindle, and wherein there is provided a carriage movable longitudinally along the turning machine having mechanism for continuously supporting the work stock immediately adjacent the turning tools that are disposed upon the carriage.

Another object of the invention is to provide a turning machine constructed and arranged with the foregoing object wherein the mechanism for supporting the work stock is driven at the same speed as the work stock, and wherein the work stock can easily slide through the supporting means so that longitudinal turning can be produced upon the work stock.

A still further object of the invention is to provide a lathe that is constructed and arranged in a manner such that articles of any length can be turned without using a tailstock, dead center or similar apparatus.

Another object of the invention is to provide a lathe having a spindle that clamps upon the work stock for driving the same and having a carriage that is movable longitudinally of the lathe constructed and arranged with a work stock support and turning tools disposed adjacent the work stock support so that the work stock is always supported whenever being worked upon by the turning tools.

It is another object of the invention to provide a lathe that can produce contour turning by the use of a simple template.

It is another object of the invention to provide a lathe having a carriage provided with a work stock support mechanism that is driven at the speed of the work stock.

It is another object of the invention to provide a lathe having mechanism for holding turning tools that is pivotally mounted upon a work stock support member carried by the lathe carriage so that longitudinal turning can be produced upon the work stock by longitudinal movement of the carriage and transverse turning can be produced by means of a constant rise cam that operates the tool holding mechanism.

It is another object of the invention to provide a mechanism for driving the work stock support means of a lathe constructed and arranged in accordance with the foregoing object.

Further objects and advantages will become apparent from the drawings and the following description.

In the drawings:

Fig. 1 is an elevational view of a turning machine embodying the features of this invention.

Fig. 2 is a longitudinal cross-sectional view of a portion of the turning machine of Fig. 1, a portion of which is in elevation, showing the drive spindle.

Fig. 3 is an end elevational view of the turning machine taken along line 3—3 of Fig. 1.

Fig. 4 is an elevational view of a constant rise cam for actuating the tool holder of the turning machine.

Fig. 5 is a transverse cross-sectional view of the tool holder of the turning machine taken along line 5—5 of Fig. 3.

Fig. 6 is a vertical cross-sectional view of a portion of the carriage of the turning machine showing the work stock supporting mechanism and the mechanism for driving the same.

Fig. 7 is a vertical cross-sectional view of the work stock supporting mechanism taken along line 7—7 of Fig. 6.

Fig. 8 is an elevational view of a template for producing contour turning upon the turning machine.

This invention relates to machines upon which articles can be produced by longitudinal and transverse turning operations. The conventional practice in turning machines and particularly lathes has been to center a piece of work stock between the spindle of a lathe and the tailstock when working upon the stock. The work stock has always been supported by the spindle of the turning machine, and if the workpiece was to be of any length, the opposite end would be centered into the tailstock. Also, it is conventional to use a compound tool support carried upon a suitable carriage so that both transverse and longitudinal turning can be produced. It has not been practical to produce long slender pieces upon conventional turning machines because the stock flexes between the spindle and the tailstock. Also, the long slender pieces were required to be centered accurately so that there could be a semblance of accuracy in the finished work.

In this invention there is provided a turning machine of a type that may be considered to be a lathe upon which workpieces of any length can be produced and which eliminates the necessity of any centering operation. The machine consists of a bed 10 that is provided with ways 11 and 12 that extend longitudinally along the bed 10. A headstock 13 is supported upon the bed 10 and is constructed and arranged for receiving a spindle 14. The spindle 14 is driven by means of a belt 15 that extends between a pulley 16 on the spindle 14 and a pulley 17 that is keyed to a drive shaft 18 bearinged in the bed 10 at opposite ends thereof as shown in Fig. 1. The drive shaft 18 carries a pulley 19 that receives a belt 20 which extends over a pulley 21 secured to a shaft 22 extending from a gear change mechanism 23 that is driven by an electric motor 24. A control handle 25 is provided for the gear change mechanism for regulating the speed ratio between the shaft 22 and the motor shaft 26. Suitable steps 27 are provided in the gear change mechanism in which the handle 25 may be placed for changing the operating ratio thereof.

A carriage 30 is supported upon the ways 11 and 12 of the bed 10. The carriage consists of a horizontal platform 31 that supports a work stock supporting member 32 through which the work stock 33 extends when being operated upon by the turning tools in the tool support 34 pivotally secured to the work stock support member 32 by means of a pivot pin 35.

The carriage 30 is provided with an apron 36 that supports the half nuts 37 that engage a lead screw 38 bearinged to the bed 10 by means of the bearing member 39 and extending into a gear change mechanism 40. A control handle 41 operates the half nuts 37 to cause them to engage the lead screw 38 when it is desired to operate the carriage from a power source.

The gear change mechanism 40 is similar to the gear change mechanism 23 for changing the speed ratio between the lead screw 38 and the spindle 14, the lead screw 38 being driven from the spindle 14 through a gear 42 carried upon the pulley 16. The gear 42 engages a spur gear 43 carried upon a shaft 44 that is bearinged in the headstock 13 as shown in Fig. 2. The gear 43 carries a beveled gear 44′ that engages a beveled gear 45 carried upon a shaft 46 that drives the gear change mechanism 40. The gear change mechanism 40 controls the speed ratio between the spindle 14 and the lead screw 38 for controlling the speed of longitudinal movement of the carriage 30 over the bed 10 of the machine.

The carriage 30 is also manually operated for longitudinal movement by means of a gear 47, see Fig. 3, that engages a rack 48 carried upon the bed 10. The gear 47 is rotated by means of a suitable micrometer control mechanism 49 provided with a handle 50.

The spindle of the machine disposed within the headstock 13 consists of a shaft 51 that is bearinged in one end of the headstock 13 by means of a ball bearing 52 that is retained in the end wall 53 of the headstock 13 by means of a ring 54 and the bolts 55 to preload the bearing 52 and thus eliminate end play in the shaft 51. The shaft 51 carries the pulley 16 that is secured thereon by means of the nut 56 and keyed thereto by means of the key 57. As shown in Fig. 2, the pulley 16 and the gear 42 for driving the gear change mechanism 40 are formed as an integral part if desired. The shaft 51 is provided with an internal bore 58 that extends axially throughout the length of the shaft 51. The bore 58 is enlarged in one end thereof as shown at 59 to receive a sleeve 60 that has an internal bore of the same diameter as the internal bore 58. A second sleeve 61 is slidably disposed in the internal bore 59 and is provided with a head 62 that is disposed within a recess 63 provided in a sleeve 64 that is externally threaded upon the shaft 51. A spring 65 is disposed between the sleeves 60 and 61 for urging the sleeve 61 forwardly when the sleeve 60 is moved forwardly by means of suitable mechanism hereinafter described.

The collet 66 is provided with a tapered head 67 that engages a tapered surface 68 in the sleeve 61 whereby the collet 66 will frictionally engage the work stock 33 extending therethrough when the sleeve 61 urges the collet 66 forwardly against the end of the sleeve 64.

The sleeve 60 is reciprocated within the bore 59 by means of levers 69 pivoted upon the pins 70. The levers 69 have ears 71 that engage the end of the sleeve 60, and have arms 72 adapted to ride upon the cam surface 73 for pivoting each lever 69 about the pin 70 to move the ears 71 in a leftward direction as viewed in Fig. 2 to release the sleeve 60 and thus relieve the sleeve 61 to permit the collet 66 to expand and release the work stock 33.

The cam surface 73 that operates the levers 69 is provided on a collar 74 that slides upon the shaft 51, ball bearings 75 being provided between the collar 74 and a yoke 76 that is engaged by pins 77 carried upon arms 78 actuated by means of the control handle 79.

From the foregoing description it will become apparent that the work stock 33 extends through the spindle 14, and that the spindle 14 drives the work stock through frictional engagement of the collet 66. The work stock 33 extends through the work stock support 32 that supports the same immediately adjacent the turning tools carried upon the work stock support member. The work stock support member 32 of this invention is constructed and arranged in a manner that it is power driven at the speed of rotation of the work stock so that there will be no bearing friction between the work stock and the support member. However, the work stock support member may be a stationary bearing member if desired.

The work stock support member 80 is supported within an upright 81 extending vertically from the platform 31 of the carriage 30. The work stock support member 80 consists of a sleeve 82 that is provided with a transverse bore 83 through which the work stock 33 extends. The bore 83 has a reduced diameter portion 84 that is adapted to accurately engage the surface of the work stock 33. The sleeve 82 is slidably disposed in a sleeve 85 that is provided with a tapered wall 86 adapted to engage a tapered wall 87 on the sleeve 82. The sleeve 85 is provided with a shoulder 88 adapted to provide a suitable stop member for a ball bearing 89 supported upon the sleeve 85. A sprocket gear 90 is placed upon the sleeve 85 adjacent the ball bearing 89 and is keyed to the sleeve 85 by means of the key member 91. A second ball bearing 92 is placed upon the sleeve 85 adjacent the sprocket gear 90 and is retained in position by means of a nut 93 threaded upon the sleeve 85 whereby the ball bearings 92 and 89 and the sprocket 90 are retained in assembled relationship upon the sleeve 85.

The upright 81 has a transverse bore 94 that receives bearing support members 95 and 96 for positioning the bearings 89 and 92 within the upright 81. The bearing support members 95 and 96 are retained to the upright 81 by means of bolts 97 and 98, respectively. A dust and oil trap 99 is provided adjacent the bearing 89.

A plate 100 is carried by a nut 101 that is threaded upon the end 102 of the sleeve 82. A plurality of springs 103 is disposed radially about the plate 100 and are positioned between the plate 100 and the nut 93 to urge the plate in a leftward direction and thus cause frictional engagement between the sleeve 82 and the work stock 33 at the reduced diameter portion 84 of the sleeve 82. Bolts 104 extend through the plate 100 into threaded engagement with the nut 93, the heads of the bolts 104 preventing outward movement of the plate 100 when the work stock 33 is removed from within the sleeve 82.

The sprocket 90 is driven by means of a chain 105 that extends through a cored passageway 106 provided in the upright 81, and which extends into engagement with a sprocket 107 secured to a sleeve 108 that is slidably disposed upon the drive shaft 18. A key 109 is provided between the sleeve 108 and the shaft 18 and is adapted to slide within the keyway provided in the shaft 18, a gib head 110 being provided upon the key 109 that extends into a groove 111 in the sleeve 108 to prevent longitudinal movement of the key 109 with respect to the sleeve 108.

The sleeve 108 carries ball bearings 112 and 113 that are retained in position by means of collars 114 and 115, respectively, secured to the sleeve 108 by means of the set screws 116 and 117. The ball bearings 112 and 113 are carried within the bearing support members 118 and 119, respectively, that are disposed within a transverse bore 120 provided in the lower end of the upright 81. The bearing support members 118 and 119 are secured to end plates 121 and 122, respectively, by means of bolts 123 and 124, the plates 121 and 122 being secured to the upright 81 by means of the bolts 125 and 126, respectively. Packing glands 127 and 128 are provided in the end plates 121 and 122, respectively, to retain the lubricant within the cored passageway 106 of the upright 81.

It will be readily apparent that since the spindle 14 and the work stock support member 80 are both driven by a common drive shaft 18 that their respective speeds of rotation will always be the same, the gear change mechanism 23 changing the speed of rotation of the drive shaft 18 and thus changing the speed of rotation of the spindle 14 and the work stock support member 80.

The turning tools 129 and 130 for producing the turning operations upon the machine of this invention are carried within tool holders 131 and 132, respectively, the tool holders being carried by the tool support 34. The tool support 34 is adapted to be rocked upon the pivot 35 for moving the tools 129 and 130 transversely of the work stock 33 and thus produce transverse turning upon the work stock. To rock the tool support 34 upon the pivot 35, a constant rise cam 133 is provided and is mounted upon a shaft 134 that is bearinged in the horizontal platform 31. The opposite end of the shaft 134 carries a micrometer actuating device 135 for rotating the shaft and thus for rotating the constant rise cam 133. A follower arm 136 is secured to the tool support 34 and is in engagement with the surface of the constant rise cam 133. A spring 137 maintains the follower in engagement with the cam surface. The micrometer device 135 for rotating the cam 133 is so calibrated that each degree of rotation of the micrometer device is equal to a predetermined rise on the surface of the constant rise cam 133 for producing a determined transverse movement of the turning tools 129 and 130 with respect to the axis of the work stock 33. Therefore, the depth of movement of the turning tools can be accurately measured. A conventional friction drive is provided between the micrometer device 135 and the cam 133 so that the micrometer device can be set to zero position regardless of the position occupied by the cam 133 so that the depth of any transverse cut made by the tools 129 and 130 can be measured from a zero position on the micrometer device 135.

The tool holders 131 and 132 may each be provided with a micrometer adjustment for accurately locking the position of the cutting edge of the turning tools carried independently, both transversely and longitudinally with respect to the work stock. The micrometer adjustment 138 is provided for regulating the movement of the tool holder 131 transversely with respect to the work stock 33, while a micrometer adjustment 139 is provided for moving the tool holder 131 longitudinally of the work stock 33 and thus position the cutting edges of the turning tools 129 and 130 in proper position with respect to one another. The tool holder 132 may be provided with the same kind of micrometer adjustments.

One of the micrometer adjustments of the tool holder is shown in Fig. 5 which in this instance is the adjustment for the longitudinal position of the turning tool 129 with respect to the work stock 33. The tool holder 131 is provided with a shaft 140 that is slidable in a bore 141 provided in the support member 142 that is carried upon the tool support 34. A threaded member 143 extends within a threaded bore 144 provided in the shaft 140, rotation of which causes axial movement of the shaft 140 to adjust the position of the tool holder 131.

If desired, an auxiliary tool 145 may be carried upon the work stock support member 32. The auxiliary tool 145 is carried in a tool holder 146 slidably mounted upon the work stock support member 32 in any suitable manner. Spring pressed pins 147 urge the tool holder in an upward direction against the pin 148 adjustably positioned within the actuating arm 149 pivoted upon a pin 150 carried in an arm 151. The pin 148 is adjustable within the arm 149 by means of a micrometer adjustment 152. A stop 153 is provided for limiting the movement of the arm 149 and thus control the depth of movement of the tool 145 into the work stock 33.

In the foregoing description it will become apparent that the machine of this invention is capable of producing a workpiece of any length regardless of the slenderness, or the length of the workpiece involved. The work stock 33 is continuously supported immediately adjacent the point of engagement of the turning tools with the work stock, and therefore the accuracy of concentric turning on the work stock is greatly increased. Also, since the work stock is supported immediately adjacent the point of turning, the stock may be turned to an extremely small diameter without any danger of breakage of the stock during the turning operation or without loss of concentricity because of any vibration of the work as caused by a small diameter section in the turned article. The turning machine thus becomes a centerless machine because the work stock will always be maintained concentric with the axis of the spindle of the machine through means of the work stock support member 80. The amount of stock that has been turned and which extends beyond the work stock support member will in no way effect the accurate turning of the stock that is immediately adjacent the work stock support member 80.

To operate the machine, the work stock 33 is fed through the spindle 14 and extended beyond the spindle 14 a sufficient amount to produce a full length of the desired article. The work stock 33 is fed through the work stock support member 80. In order to produce the desired turned diameters upon the work stock 33, the tool support 34 is rocked upon the pivot 35 by means of rotation of the constant rise cam 133, whereby one or the other of the turning tools 129 and 130 are advanced toward the axis of the work stock 35 to a desired depth which is indicated by the micrometer control device 135. The carriage 30 is then moved longitudinally along the ways 11 and 12 by means of the handle 50, the micrometer device 49 indicating the length of the longitudinal cut being made. The turning operation is always begun at the outer end of the work stock 33 so that the stock that extends through the work stock support member 80 will always be supported by the sleeve 82 in the work stock support member. By moving the carriage from right to left, as shown in Fig. 1, the turning operations for producing various diameters and various length cuts can proceed, each cut being maintained accurately concentrically because the work stock is always supported adjacent the turning tools. It is readily apparent the length of the article to be produced is limited only by the length of travel of the carriage 30.

The sprocket 107 for driving the work stock support member 80 is slidable along the drive shaft 18, and is movable with the carriage 30 since the upright 81 is integral with the carriage 30. Therefore, the sleeve 82 of the work stock support member will be driven at the same speed as the work stock to eliminate bearing friction between the work stock and the support member.

If it is desired to power feed the carriage at any time, the half nuts 37 can be clamped upon the lead screw 38 for driving the carriage in either direction of movement, suitable reversing mechanism being provided, if desired, or the half nuts can be released after the carriage has traveled in a leftward direction so that it can be returned in a rightward direction by means of the manual control handle 50. The speed of rotation of the lead screw 38 is, of course, controlled by the gear change mechanism 40.

The ratio of speed of rotation between the lead screw 38 and the work stock 33 determines the rate of travel of the carriage longitudinally along the work stock. Thus, by properly regulating the gear change mechanism 40, suitable threading operations can be performed upon the work stock by means of the turning tools 129 and 130.

If it is desired to produce special contours upon the stock 33, such as tapers, curves and others, the manual control 135 for the tool support 34 can be disconnected, or the cam 133 removed to permit the follower 136 to engage a template, or a separate follower can be provided to engage a template 154, as shown in Fig. 8. The follower 155 upon engaging the template 154 is adapted to rock the tool support 34 upon the pivot 35 and thus regulate the depth of advancement of one of the turning tools 129 and 130 in the work stock. Since the follower 155 will accurately transmit the depth of the valleys in the template 154 to the tool support 34, and will accurately transmit the length of the lands of the template 154 to the tool support 34, it is readily apparent that a complicated contour can readily be produced upon the machine of this invention by use of an inexpensive template. Suitable means, of course, is provided for adjusting the relationship between the template and the follower 155 so that the tools will begin their turning operation at the proper depth and at the proper longitudinal position upon the work stock 33.

While the apparatus herein shows a preferred form of the invention, yet it is to be understood that the apparatus is capable of substantial mechanical alteration without departing from the spirit of the invention, and that all such modifications as fall within the scope of the appended claims are intended to be included herein.

Having thus fully described our invention what we claim as new and desire to secure by Letters Patent is:

1. A turning machine for working bar stock which consists of a bed, a spindle carried by said bed for engaging and driving bar stock that extends therethrough, a carriage movable longitudinally on said bed having bearing means thereon through which bar stock extends for bearing support therein, a turning tool on said carriage disposed immediately adjacent said bearing support for producing a turning operation adjacent said support, means for moving said turning tool transversely with respect to said support in predetermined timed relation with longitudinal movement of said carriage on and along said bed, means for moving said carriage longitudinally on said bed, and means for driving said bearing and spindle synchronously.

2. A turning machine comprising in combination, a bed, a head stock having a spindle mechanism therein adapted to be driven for receiving work stock extending therethrough to engage the same for driving the work stock, a carriage movable longitudinally on said bed having bearing means for receiving and supporting work stock extending from said spindle, said bearing means being movable with said carriage toward said spindle to support the workpiece during a turning operation, and a plurality of turning tools supported upon said carriage having pivot means located below and in vertical alignment with said bearing means to permit transverse oscillation of said turning tool with respect to the axis of said bearing means to thereby regulate the depth of the cut produced by the turning tool, means to control the movement of said tools, and means for driving said carriage longitudinally along said bed to produce longitudinal turning upon work stock extending through said bearing means.

3. A carriage for a turning machine comprising a platform adapted to be supported by a bed of a turning machine for longitudinal movement thereon, a support member extending upwardly from said platform having bearing means therein for receiving work stock to support the same, turning tool support means, means located below and in vertical alignment with said bearing means for pivotally supporting said turning tool support means upon said first mentioned support member to dispose turning tools carried by said turning tool support means immediately adjacent and on opposite sides of stock supported by said bearing means, means for oscillating said turning tool support means on said pivot to regulate the depth of cut produced by tools carried by said tool support means, and means on said carriage for engaging driving means on the turning machine for producing longitudinal movement of the carriage on the turning machine.

4. A turning machine comprising in combination, a bed, a headstock having a spindle mechanism therein adapted to be driven and to receive work stock therethrough for engaging the work stock and thereby driving the same, a drive shaft extending longitudinally of said bed, a carriage, means for driving said carriage longitudinally of said bed, said carriage including a support member having rotatable bearing means therein for receiving work stock and for supporting the same during the turning operation, drive means slidable on said drive shaft and disposed in said carriage, means drivingly interconnecting said drive means with said bearing means for rotating the same, whereby said bearing means rotates with the work stock therein and slides over said work stock during movement of the carriage upon said bed, and a turning tool pivotally supported below and in vertical alignment with the work stock supported in said bearing means, said tool being supported immediately adjacent said bearing means.

5. A carriage for a turning machine comprising a platform adapted to be slidably carried upon a bed of a turning machine, support means extending from said platform, bearing means rotatably disposed in said support means, a sleeve carried by said bearing means for rotation therewith and adapted to receive work stock extending from the spindle of the turning machine, drive means carried by said sleeve, drive means carried by said carriage and adapted to be slidably disposed upon a drive shaft for movement thereover when the carriage moves with respect to the drive shaft, drive means extending between said first and second mentioned drive means, a turning tool support member having pivot means supporting the same upon said first mentioned support member, means for rotating said tool support member upon said pivot to produce transverse movement of tools carried thereby relative to work stock extending through the bearing means, and means for securing turning tools upon said turning tool support member to dispose the same immediately adjacent said sleeve for producing a turning operation upon work stock extending from the sleeve.

6. A carriage for a turning machine comprising a platform adapted to be slidably carried upon a bed of a turning machine, support means extending from said platform, bearing means rotatably disposed in said support means, a sleeve carried by said bearing means for rotation therewith and adapted to receive work stock extending from the spindle of the turning machine, drive means carried by said sleeve, drive means carried by said carriage and adapted to be slidably disposed upon a drive shaft for movement thereover when the carriage moves with respect to the drive shaft, drive means extending between said first and second mentioned drive means, a turning tool support member having pivot means located immediately below said sleeve for supporting the same upon said first mentioned support member, means for securing turning tools upon said turning tool support member to dispose the same immediately adjacent and upon opposite sides of said sleeve for producing a turning operation upon work stock extending from the sleeve, and means for oscillating said work tool support member upon said pivot in predetermined increments to regulate the transverse movement of the turning tool carried thereby with respect to the axis of said sleeve.

7. An apparatus for supporting work stock immediately adjacent the turning tools of a turning machine which consists of a support member disposed upon the turning machine immediately adjacent the turning tools of the machine, bearing means disposed in said support member including resilient sleeve means for engaging work stock adapted to extend therethrough for supporting the same, resilient means for urging said sleeve means into engagement with work stock therein, drive means carried by said sleeve, bearing means disposed within said support member for receiving drive means adapted to be slidably disposed upon said drive shaft extending through said support member for movement thereover upon movement of said support member with respect to the drive shaft, and drive means extending between said first and second mentioned drive means for rotating said sleeve.

8. A lathe for working upon bar stock that extends from a spindle of said lathe, the work upon the bar stock being produced in a direction from the extending end portion of the stock toward the spindle, the lathe consisting of, a bed, a driven spindle for supporting bar stock and rotatively driving the same, a carriage movable longitudinally upon said bed having a bearing movable therewith for receiving and supporting bar stock extending from said spindle, a turning tool disposed upon said carriage and positioned relative to said bearing to produce a turning operation upon bar stock extending therethrough immediately adjacent said bearing, said turning tool being positioned on the opposite side of said bearing relative to the spindle side thereof whereby said bearing is positioned between said tool and said spindle, means for moving said tool transversely with respect to said bearing in predetermined relation with movement of said carriage longitudinally along said bed while work is being performed on the bar stock, means for moving said carriage longitudinally on said bed toward said spindle whereby a turning operation on work stock extending from said spindle and through said bearing can proceed from the end of said work stock toward said spindle with the work stock being constantly supported adjacent the turning tool on the full periphery of the work stock, and means for driving said bearing at spindle speed.

9. In a turning machine, the combination of, a bed, a headstock on said bed and having a spindle mechanism therein adapted to engage work stock and rotate the same on an axis, a carriage movable longitudinally upon said bed and having bearing means movable therewith concentric with the axis of said spindle for receiving and supporting work stock extending therethrough, said bearing means being rotatable in said carriage, a turning tool disposed adjacent said bearing means on the side thereof opposite to the spindle side of the bearing means for producing a turning operation immediately adjacent said bearing means, means for transversely moving said turning tool with respect to said bearing means, in timed relation with the movement of said carriage along said bed to operably control the depth of cut made thereby during a turning operation, means for longitudinally driving said carriage in predetermined relation with said spindle to produce longitudinal turning upon the work stock extending through said bearing means, and means for synchronously driving said spindle and said bearing means.

10. In a turning machine, the combination of, a bed, a headstock having a spindle mechanism therein adapted to be driven which engages work stock and drives the same, a carriage movable longitudinally upon said bed and having bearing means movable therewith in axial alignment with said spindle for receiving and supporting work stock extending therethrough, said bearing means being rotatable in said carriage, a turning tool disposed adjacent said bearing means on the side thereof opposite to the spindle side of the bearing means for producing a turning operation immediately adjacent said bearing means, means for transversely moving said turning tool with respect to said bearing to operably control the depth of cut made thereby during a turning operation, means for longitudinally driving said carriage to produce longitudinal turning upon the work stock extending through said bearing means, drive shaft means extending longitudinally of said bed, means drivingly connecting said drive shaft means and said bearing means and slidable upon said drive shaft, and means drivingly connecting said drive shaft to said spindle, whereby said spindle and said bearing means are driven at the same speed.

11. In a turning machine, the combination of, a bed, a headstock having a spindle mechanism therein adapted to be driven which engages work stock and drives the same, a carriage movable longitudinally upon said bed and having bearing means movable therewith in axial alignment with said spindle for receiving and supporting work stock extending therethrough, said bearing means being rotatable in said carriage, a turning tool disposed adjacent said bearing means on the side thereof opposite to the spindle side of the bearing means for producing a turning operation immediately adjacent said bearing means, means for transversely moving said turning tool with respect to said bearing to operably control the depth of cut made thereby during a turning operation, means for longitudinally driving said carriage to produce longitudinal turning upon the work stock extending through said bearing means, drive shaft means extending longitudinally of said bed, means drivingly connecting said drive shaft means and said bearing means and slidable upon said drive shaft, means drivingly connecting said drive shaft to said spindle, whereby said spindle and said bearing means are driven at the same speed, means for selecting the speed of rotation of said drive shaft, and means for selecting the speed of longitudinal movement of said carriage, whereby said turning tool can produce threads upon the work stock.

12. In a lathe of the character described, a frame, a carriage translatably guided on and along said frame parallel to an axis, a sleeve journaled in said carriage concentric of said axis, means carried by said sleeve to receive and slidably engage a work piece, a sprocket connected to said sleeve concentric of said axis, a shaft journaled in said frame parallel to said axis, means for rotating said shaft, a sprocket journaled in said carriage and splined to said shaft, and endless chain means connecting said sprockets for synchronous rotation.

DELBERT I. WILSON.
JOHN W. QUINN.